United States Patent [19]
Takeshita et al.

[11] Patent Number: 4,721,740
[45] Date of Patent: Jan. 26, 1988

[54] DISPERSION-IMPROVED CARBON BLACK COMPOUNDED RUBBER COMPOSITION

[75] Inventors: Michitaka Takeshita, Koganei; Mitsuo Kiboku, Hiroshima; Seishiro Ito, Ikoma; Tatsuhiko Ihara, Kure, all of Japan

[73] Assignee: Bridgestone Corporation, Tokyo, Japan

[21] Appl. No.: 883,225

[22] Filed: Jul. 8, 1986

[30] Foreign Application Priority Data

Jul. 8, 1985 [JP] Japan ................................. 60-149831

[51] Int. Cl.$^4$ .............................................. C08K 9/00
[52] U.S. Cl. ..................................... 523/215; 523/200; 524/496; 524/571; 524/573
[58] Field of Search ................................. 523/200, 215

[56] References Cited

U.S. PATENT DOCUMENTS

| | | | |
|---|---|---|---|
| 3,025,259 | 3/1962 | Watson et al. | 523/215 |
| 4,051,659 | 10/1977 | Blakelock | 523/215 |
| 4,564,647 | 1/1986 | Hayashi et al. | 523/215 |
| 4,631,304 | 12/1956 | Wilder | 523/215 |

FOREIGN PATENT DOCUMENTS 0002711 2/1984 Japan .
0802317 2/1981 U.S.S.R. ............................... 523/215

*Primary Examiner*—Herbert J. Lilling
*Attorney, Agent, or Firm*—Sughrue, Mion, Zinn, Macpeak & Seas

[57] ABSTRACT

A dispersion improved carbon black compounded rubber composition comprises a rubber component and a reinforcing carbon black in an amount of from 30 to 150 parts by weight with respect to 100 parts by weight of the rubber component. The rubber component is selected from a group consisting of a natural rubber, synthetic isoprene rubber and a mixture thereof, or a blend of this rubber component with a diene base synthetic rubber other than this rubber component. The reinforcing carbon black has a specific surface area of from 70 to 200 m$^2$/g when measured by a nitrogen adsorption method and a DBP value of from 80 to 130 ml/100 g, and is obtained by introducing mainly phenolic hydroxide groups into the surface of the carbon black through plasma treatment at low temperatures or by introducing carboxyl groups and the phenolic hydroxide groups thereinto through plasma treating at low temperatures and neutralizing the thus introduced acid groups.

8 Claims, No Drawings

DISPERSION-IMPROVED CARBON BLACK COMPOUNDED RUBBER COMPOSITION

Background of the Invention

1. Field of the Invention

The present invention relates to a rubber composition into which is compounded dispersion-improved carbon black and which is used in tires and other various rubber articles. More specifically, the invention relates to a technique applicable for technical fields including electron optics, cable production industry, etc. in which coloring and reinforcement with carbon are required.

2. Related Art Statement

In the case that various rubber articles in which a filler including carbon black is dispersed into a polymer are produced, this filler is generally required to be maintained in a stably dispersed state. Thus, in order to improve the dispersibility and the reinforcing property of the above filler with respect to the polymer, there have been made improvements on a kneading way, a way of compounding an additive such as oil, etc., but no sufficient effects could be obtained.

Under the circumstances, as reported in Kenji Tominaga, "Polymer Digest" 34, (3) 23 (1982) and 34 (5) 40 (1982) and Fumio Ide, "Plastic Age", 31, 93 (1985), etc., although studies have been continued to uniformly disperse a filler such as carbon black, calcium carbonate, silica, etc. into polymers and at the same time improve wetting property (affinity) through compounding a titanate coupling agent or treating the surface of the filler, no great improving effect could not be obtained with respect to carbon black.

The present inventors have treated the surface of carbon with KR38S made by Kenrich Petrochemical Inc. which was considered particularly effective among the titanate coupling agents and compounded and kneaded the resulting carbon into polymers, but almost no improving effect was not observed.

The reason why the titanate coupling agents do not exhibit sufficient effect of dispersing carbon black into the polymers is considered to be that since cohesion between carbon black particles is too large in the case that the surface of the carbon black is extremely active, sufficient dispersion-improving effect can not be obtained only by improving the wetting property (affinity) to the polymers.

On the other hand, a process for improving the dispersibility of carbon black into water through oxygen plasma treatment at low temperatures is known from Japanese patent publication No. 2,711/84. Effect of improving the dispersibility of carbon black was observed when carbon black surface-modified by this process was compounded into the rubber composition.

In this case, however, the tensile strength of the rubber composition was extremely lowered, so that such a rubber composition was not practical.

After investigation of a cause to extremely lower the tensile strength, it was revealed that vulcanizing speed is retarded to lower the cross-linked density. As described in Japanese patent publication No. 2,711/84, this is considered to be that acid groups are introduced into the surface of carbon. That is, as shown in Yutaka Kawaoka, "Vulcanization and Vulcanization Adjustment" published by Nippon Kogyo Shinbun and "Vulcanizing Agent Handbook" edited by Shinzo Yamashita and Tosuke Kaneko, published by Taiseisha, it is said that when the acid compound is compounded, the vulcanizing speed is retarded to lower the cross-linked density, thereby generally deteriorating the physical properties of vulcanized rubbers.

SUMMARY OF THE INVENTION

Upon having made various examinations to solve the above-mentioned disadvantages of the above-mentioned prior art techniques, the present inventors have found out that when the production of strong acid groups such as carboxyl groups among the acid groups introduced into the surface of carbon black through low temperature plasma treatment is restrained while mainly phenolic hydroxide groups are preferentially produced, only the carbon-dispersing action can be improved without retarding the vulcanization speed, and accomplished the present invention.

The present invention relates to a rubber composition compounded with dispersion-improved carbon black in an amount of from 30 to 150 parts by weight with respect to 100 parts by weight of a rubber component selected from a group consisting of natural rubber, synthetic isoprene rubber and a mixture thereof or a blend of this component with one or more kinds of diene synthetic rubber other than the former rubbers, said carbon black having a specific surface area of from 70 to 200 $m^2/g$ when measured by a nitrogen adsorption method and a DBP value of from 80 to 130 ml/100 g and being obtained by introducing mainly phenolic hydroxide groups into the surface of carbon black through plasma treatment at lower temperatures or by introducing carboxyl groups and phenolic hydroxide groups thereinto through such a plasma treatment and then neutralizing the introduced acid groups.

According to the present invention, as the above diene synthetic rubber other than the first rubbers, use may be made of styrene-butadiene rubber, butadiene rubber, butyl rubber, ethylene-propylene rubber, chloroprene rubber and nitrile rubber.

According to the present invention, the action of dispersing carbon can be improved without retarding the vulcanizing speed of the rubber composition with the carbon black. Thereby, excellent effects of improving the heat generating property and reinforcing property of the rubber composition can be obtained.

These and other objects, features and advantages of the present invention will be well appreciated upon reading of the following description of the invention with understanding that some modifications, variations and changes of the same could be made by the skilled in the art to which the invention pertains without departing from the spirit of the invention or the scope of the claims.

DETAILED DESCRIPTION OF THE INVENTION

Plasma used in the treatment of carbon black according to the present invention belongs to low temperature plasma. As a power source for producing such a low temperature plasma, mention may be made of high frequency waves, micro waves, direct current, alternative current, etc. As a discharging type, mention may be made of glow discharging, corona discharging, boxer charger, etc. due to inductive loading or capacity loading.

As a plasma treating gases, use may be made of one kind of a mixture of two kinds of oxygen, carbon dioxide, carbon monoxide, hydrogen, nitrogen, argon, and helium.

When the plasma treatment is done at a low pressure, vacuum degree in a treating vessel is set at from $10^2$ Torr to several Torr, preferably from $10^2$ Torr to 0.7 Torr.

On the other hand, when the plasma treatment is carried out at ordinary pressure, treatment is done in atmosphere itself or while the treating gas is brought into contact with carbon black.

In the present invention, mainly phenolic hydroxide groups or the phenolic hydroxide groups and carboxyl groups are introduced into the surface of carbon black through the above plasma treatment. Control is made to obtain such a surface characteristics of carbon black that the concentration of the phenolic hydroxide groups is not less than 0.1 meq/g and the concentration of the carboxyl groups is not more than 0.15 meq/g.

On the other hand, when the concentration of the carboxyl groups is high after the above plasma treatment (the first step), that is, the carbon black has the surface characteristics that the concentration of the carboxyl groups exceeds 0.15 meq/g, the carbon black is treated again with plasma in a basic gas (second step) or after the carbon black is taken out from a plasma treating (first step) device, it is neutralized with ammonia, amine or the like to obtain carbon black having the surface characteristics exhibiting the same effects as mentioned above.

In the above two step neutralizing plasma treatment, the inflow of the treating gas is stopped after the completion of the plasma treatment in the first step, and then a vacuum degree is lowered to not more than $10^2$ Torr and this state is maintained for about 15 minutes to completely remove the treating gas. Thereafter, the basic gas such as ammonia, amine or the like is introduced, and plasma is generated again at a low pressure of from $10^2$ Torr to several Torr, preferably from $10^2$ Torr to 0.7 Torr while a flask is rotated, thereby performing the low temperature plasma treatment in the basic gas plasma stream for not less than 5 minutes.

On the other hand, as mentioned above, ordinary neutralization reaction may be utilized after the carbon black is taken out from the plasma treating (first step) device. That is, neutralization may be carried out by immersing the taken-out carbon black into an aqueous solution or an organic solvent solution of a basic substance such as ammonia, amine or the like. In this case, after the neutralization treatment, it is important that an excess amount of the basic substance is removed through washing, followed by sufficient drying to remove water or the organic solvent.

The carbon black treated above to have desired surface characteristics is compounded in an amount of from 30 to 150 parts by weight, preferably, from 30 to 80 parts by weight, with respect to 100 parts by weight of the rubber component.

Sulfur as a vulcanizing agent, a vulanizing accelerator, an antioxidant, a softener, a filler, etc. may be appropriately compounded into the rubber composition according to the present invention.

In the present invention, the specific surface area was measured by the nitrogen adsorption method according to ASTM D 3027, and DBP was measured according to JLS K 6221.

The reinforcing carbon black to be compounded into the rubber composition according to the present invention is required to have the specific surface area of from 70 to 200 m$^2$/g when measured by the nitrogen adsorption method and the DBP value of from 80 to 130 ml/100 g. If the specific surface area and the DBP value are lower than the respective lower limits, the effect of improving the dispersibility through the low temperature plasma treatment is low, while if they exceeds the respective upper limits, the dispersibility is poor and the heat generation increases.

If the concentration of the phenolic hydroxide groups introduced into the surface of the reinforcing carbon black through the low temperature plasma treatment thereof is lower than 0.1 meq/g, the effect of improving the dispersibility of carbon is low, and therefore the effects of improving the heat generating properly and the reinforcing property are small.

Further, if the concentration of the carboxyl groups similarly introduced exceeds 0.15 meq/g, the vulcanizing speed becomes small to lower the cross-linked density and therefore extremely lower the tensile strength. Thus, this offsets the reinforcement-increasing effect due to the improvement on the dispersibility of carbon, so that no reinforcement-improving effect can be observed.

For the above reasons, according to the present invention, it is necessary to use carbon black having the surface characteristics that the concentration of the phenolic hydroxide groups is not less than 0.1 meq/g, while that of the carboxyl groups is not more than 0.15 meq/g.

The reason why the compounding amount of the reinforcing carbon black is set within a range of from 30 to 150 parts by weight with respect to 100 parts by weight of the rubber component is that if it is less than 30 parts by weight, sufficient reinforcement is not obtained, while if it is more than 150 parts by weight, poor dispersion of carbon occurs to lower the strength at break and workability in factories, such as in refinery, extrusion, etc. is deteriorated, while the physical properties being not stabilized. Thus, this is impractical.

In the following, the present invention will be explained with reference to the following Examples, which are merely given in illustration thereof but never interpreted to limit the scope thereof.

(1) Vacuum low temperature plasma treatment:

50 g of carbon black was placed into a 500 ml pyrex flask type plasma chamber, and was subjected to vacuum low temperature plasma treatment while the chamber was rotated at not less than 5 rpm to make the treatment uniform and restrain the ashing.

This vacuum low temperature plasma treatment was carried out by adopting treating gases and treating temperatures shown in Tables 1 and 2 under the conditions that the high frequency output (13.56 MHz), the vacuum degree and the flow rate of the treating gas were 25 W, 0.3 Torr and 50 ml/min, respectively. A second step plasma neutralizing treatment in Table 2 was carried out under similar conditions.

The concentrations of the phenolic hydroxide groups and the carboxyl groups introduced into the surface of carbon through the above treatment are shown together in Tables 1 and 2.

The measurement of the concentrations of the functional groups on the surface were carried out by similar methods as reported in Tatsuhiko Ihara et al, "Shikizai", 54, 531 (1981).

TABLE 1

| Kind of carbon | Treating gas O$_2$/N$_2$ ratio (%) | Treating time (min.) | Functional group surface concentration (meq/g) | |
|---|---|---|---|---|
| | | | —COOH group | —OH group |
| ISAF carbon A | — | 0 | 0.00 | 0.025 |
| ISAF carbon B | 20/80 | 2 | 0.00 | 0.028 |
| ISAF carbon C | 20/80 | 10 | 0.010 | 0.108 |
| ISAF carbon D | 20/80 | 60 | 0.033 | 0.320 |
| ISAF carbon E | 50/50 | 60 | 0.098 | 0.284 |
| ISAF carbon F | 70/30 | 60 | 0.245 | 0.351 |

TABLE 2

| Kind of carbon | Plasma treating conditions in first step | | Plasma neutralizing treating condition in second step | | Functional group surface concentration after second step plasma treatment (meq/g) | |
|---|---|---|---|---|---|---|
| | Treating gas (mixing ratio) | Treating time (min.) | Treating gas | Treating time (min.) | —COOH group | —OH group |
| ISAF carbon G | O$_2$/N$_2$ (80/20) | 80 | — | 0 | 0.320 | 0.0282 |
| ISAF carbon H | O$_2$/N$_2$ (80/20) | 80 | NH$_3$ | 10 | 0.103 | 0.0257 |
| ISAF carbon I | O$_2$/N$_2$ (80/20) | 80 | NH$_3$ | 30 | 0.067 | 0.196 |
| ISAF carbon J | O$_2$/N$_2$ (80/20) | 80 | pyridine | 30 | 0.038 | 0.175 |
| ISAF carbon K | O$_2$/Ar (80/20) | 80 | NH$_3$ | 30 | 0.073 | 0.203 |

Further, after the vacuum low temperature plasma treatment was carried out under the same conditions as mentioned above while adapting a treating gas and a treating time shown in Table 3, the following neutralization treatment was carried out through a neutralization method other than the plasma neutralization treatment.

First, in the case of ISAF carbon L in Table 3, 20 g of methyl aniline was dissolved into 1,000 ml of toluene, and 100 g of the carbon black plasma-solution, in the above was added into the resulting solution, which was heated to 120° C. and refluxed at a boiling point for one hour. Then, a product was filtered, washed with 1,000 ml of toluene, and then dried under vacuum at 50° C. over night.

In the case of ISAF carbon M, 100 g of the carbon black plasma-treated in the above was added into 500 ml of conc. ammonia water, which was refluxed at 100° C. for one hour. Thereafter, water was distilled off under further heating. The resultant was washed with 1,000 ml of water and dried under vacuum at 50° C. over night.

The concentrations of the phenolic hydroxide groups and the carboxyl groups introduced into the surface of carbon through the above treatment are shown together in Table 3.

TABLE 3

| Kind of carbon | Plasma treating conditions | | Functional group surface concentration after neutralizing treatment (meq/g) | |
|---|---|---|---|---|
| | Treating gas (mixing ratio) | Treating time (min.) | —COOH group | —OH group |
| ISAF carbon L | O$_2$/N$_2$ (80/20) | 80 | 0.081 | 0.184 |
| ISAF carbon M | O$_2$/N$_2$ (80/20) | 80 | 0.056 | 0.193 |

(2) Ordinary pressure low temperature plasma treatment;

Treating way using a boxer charger as the ordinary pressure low temperature plasma treatment is shown in the following.

Two electrode plates in which a slit-like discharge electrode was attached on a front surface and an inducing electrode was attached on a rear surface were opposed to each other. An AC high voltage was applied between the electrodes. After it was confirmed that planar plasma was produced in such a state, carbon black in Table 4 was dropped in air between the planar electrodes at a rate of 50 g per minute. This was repeated at a specific number of repetition.

The concentrations of the phenolic hydroxide groups and the carboxyl groups introduced into the surface of carbon through the above treatment are shown together in Table 4.

TABLE 4

| Kind of carbon | Treating gas | Number of passing through electrodes | Functional group surface concentration (meq/g) | |
|---|---|---|---|---|
| | | | —COOH group | —OH group |
| ISAF carbon A | — | — | 0.00 | 0.025 |
| ISAF carbon N | air | 1 | 0.01 | 0.043 |
| ISAF carbon O | air | 5 | 0.023 | 0.126 |
| ISAF carbon P | air | 10 | 0.040 | 0.153 |

Each carbon black in Table Nos. 1–4 treated in the above (1) and (2) was compounded into a rubber composition in a compounding recipe (part by weight) shown in Tables 5–7.

With respect to the thus obtained rubber compositions, tan δ as an indicator of hte dispersibility of carbon and the tensile strength as an indicator of the reinforcing property were measured.

Tan δ was measured by using a mechanical spectrometer made by Reometrics Co. (dynamic shear strain amplitude: 1.0%, vibration: 1.0 Hz, and measuring temperature: 30° C.). The smaller the measured value, the more excellent the dispersibility. On the other hand, the tensile strength [T/B (kg/cm$^2$)] was measured according to JIS K 6301.

Measurement results on tan δ and the tensile strength are shown together in Tables 5–7.

TABLE 5(a)

|  | Comparative example 1 | Comparative example 2 | Example 1 | Example 2 | Example 3 | Comparative example 3 |
|---|---|---|---|---|---|---|
| Natural rubber | 100 | 100 | 100 | 100 | 100 | 100 |
| Styrene-butadiene rubber 1500 | | | | | | |
| Isobutene-isoprene rubber | | | | | | |
| ISAF carbon A | 50 | | | | | |
| ISAF carbon B | | 50 | | | | |
| ISAF carbon C | | | 50 | | | |
| ISAF carbon D | | | | 50 | | |
| ISAF carbon E | | | | | 50 | |
| ISAF carbon F | | | | | | 50 |
| Stearic acid | 2 | 2 | 2 | 2 | 2 | 2 |
| Amine base antioxidant | 1 | 1 | 1 | 1 | 1 | 1 |
| Zinc oxide | 4 | 4 | 4 | 4 | 4 | 4 |
| Sulfur | 1.5 | 1.5 | 1.5 | 1.5 | 1.5 | 1.5 |
| Cyclohexyl-benzothiazolsulfeneamide | 1 | 1 | 1 | 1 | 1 | 1 |
| Diphenylguanidine | — | — | — | — | — | — |
| Tetramiethylthiuram-disulfide | — | — | — | — | — | — |
| Dibenzothiazyl-disulfide | — | — | — | — | — | — |
| Dispersibility tan $\delta$ | 0.107 | 0.101 | 0.086 | 0.075 | 0.078 | 0.076 |
| Tensile strength TB (kg/cm$^2$) | 264 | 265 | 290 | 295 | 280 | 260 |

TABLE 5(b)

|  | Comparative example 4 | Example 4 | Comparative example 5 | Example 5 | Comparative example 6 | Example 6 |
|---|---|---|---|---|---|---|
| Natural rubber | | | 50 | 50 | | |
| Styrene-buradiene rubber 1500 | 100 | 100 | 50 | 50 | | |
| Isobutene-isoprene rubber | | | | | 100 | 100 |
| ISAF carbon A | 50 | | 50 | | 50 | |
| ISAF carbon B | | | | | | |
| ISAF carbon C | | | | | | |
| ISAF carbon D | | 50 | | 50 | | 50 |
| ISAF carbon E | | | | | | |
| ISAF carbon F | | | | | | |
| Stearic acid | 2 | 2 | 2 | 2 | 2 | 2 |
| Amine base antioxidant | 1 | 1 | 1 | 1 | 1 | 1 |
| Zinc oxide | 4 | 4 | 4 | 4 | 4 | 4 |
| Sulfur | 1.5 | 1.5 | 1.8 | 1.8 | 1.5 | 1.5 |
| Cyclohexyl-benzothiazolsulfeneamide | 0.7 | 0.7 | 0.7 | 0.7 | — | — |
| Diphenylguanidine | 0.3 | 0.3 | 0.3 | 0.3 | — | — |
| Tetramethylthiuram-disulfide | — | — | — | — | 1.2 | 1.2 |
| Dibenzothiazyl-disulfide | — | — | — | — | 0.3 | 0.3 |
| Dispersibility tan $\delta$ | 0.196 | 0.165 | 0.185 | 0.157 | 0.336 | 0.290 |
| Tensile strength TB (kg/cm$^2$) | 259 | 273 | 254 | 268 | 84.0 | 95.3 |

TABLE 6

Carbon blacks shown in Tables 2 and 3

|  | Comparative example 7 | Example 7 | Example 8 | Example 9 | Example 10 | Example 11 | Example 12 |
|---|---|---|---|---|---|---|---|
| Natural rubber | 100 | | | | | | |
| ISAF carbon G | 50 | | | | | | |
| ISAF carbon H | | 50 | | | | | |
| ISAF carbon I | | | 50 | | | | |
| ISAF carbon J | | | | 50 | | | |
| ISAF carbon K | | | | | 50 | | |
| ISAF carbon L | | | | | | 50 | |
| ISAF carbon M | | | | | | | 50 |
| Stearic acid | 2 | 2 | 2 | 2 | 2 | 2 | 2 |
| Amine base antiosidant | 1 | 1 | 1 | 1 | 1 | 1 | 1 |
| Zinc oxide | 4 | 4 | 4 | 4 | 4 | 4 | 4 |
| Sulfur | 1.5 | 1.5 | 1.5 | 1.5 | 1.5 | 1.5 | 1.5 |
| Cyclohexyl-benzothiazolsulfeneamide | 1.0 | 1.0 | 1.0 | 1.0 | 1.0 | 1.0 | 1.0 |
| Dispersibility tan $\delta$ | 0.077 | 0.073 | 0.072 | 0.075 | 0.076 | 0.075 | 0.076 |
| Tensile strength TB (kg/cm$^2$) | 247 | 278 | 293 | 301 | 286 | 276 | 284 |

TABLE 7

| | Carbon blacks shown in Table 4 | | | |
|---|---|---|---|---|
| | Comparative Example 1 | Comparative Example 8 | Example 13 | Example 14 |
| Natural rubber | 100 | 100 | 100 | 100 |
| ISAF carbon A | 50 | | | |
| ISAF carbon N | | 50 | | |
| ISAF carbon O | | | 50 | |
| ISAF carbon P | | | | 50 |
| Stearic acid | 2 | 2 | 2 | 2 |
| Amine base antioxidant | 1 | 1 | 1 | 1 |
| Zinc oxide | 4 | 4 | 4 | 4 |
| Sulfur | 1.5 | 1.5 | 1.5 | 1.5 |
| Cyclohexyl-benzo-thiazolsulfeneamide | 1 | 1 | 1 | 1 |
| Dispersibility tan δ | 0.107 | 0.102 | 0.088 | 0.081 |
| Tensile strength TB (kg/cm$^2$) | 264 | 267 | 286 | 290 |

From Table 5, the rubber compositions each containing ISAF carbon C, D or E the surface concentrations of the functional groups of which are fallen in the ranges of the present invention are both more excellent both in the dispersibility and the tensile strength as compared with the other ISAF carbon A, B and F.

It is revealed from Table 6 that both the neutralization way using the plasma treatment and the neutralization way using a treatment other than the plasma treatment give excellent results on the dispersibility and the tensile strength when the concentrations of the functional groups are fallen in the ranges of the present invention.

Further, it is confirmed from Table 7 that excellent effects can be obtained in the ordinary pressure low temperature plasma treating method as in the case of the Vacuum low temperature plasma treating method.

As has been explained in the above, when the production of the strong acid groups such as carboxyl groups of the acid groups introduced into the surface of the carbon black through low temperature plasma treatment is restrained while mainly phenolic hydroxide groups are preferentially produced, only the carbon-dispersing action can be improved without retarding the vulcanizing speed in the rubber composition into which such a carbon is compounded. Thereby, the heat generating property and the reinforcing property of the rubber composition can be improved.

What is claimed is:
1. A rubber composition comprising
   (1) a rubber component selected from a group consisting of
      (a) natural rubber,
      (b) synthetic isoprene rubber,
      (c) a mixture thereof and
      (d) a blend therewith of a diene base synthetic rubber other than said rubbers (a) and (b) and
   (2). a reinforcing carbon black in an amount of from 30 to 150 parts by weight with respect to 100 parts by weight of the rubber component, said carbon black having a specific surface area of from 70 to 200 m$^2$/g when measured by a nitrogen adsorption method and a DBP value of from 80 to 130 m/100 g and being obtained by introducing mainly phenolic hydroxyl groups into the surface of the carbon black through plasma treatment at low temperatures.

2. A rubber composition according to claim 1, wherein carboxyl groups are also introduced into the surface of the carbon black through plasma treatment at low temperatures, and neutralization of resulting alkali-reactive groups consisting of the phenolic hydroxyl groups and the carboxyl groups is performed after the low temperature plasma treatment.

3. A rubber composition according to claim 1, wherein the diene base synthetic rubber other than said rubbers is one selected from a group consisting of styrene-butadiene rubber, butadiene rubber, butyl rubber, ethylene-propylene rubber, chloroprene rubber and nitrile rubber.

4. A rubber composition according to claim 2, wherein the diene base synthetic rubber other than said rubber is one selected from a group consisting of styrene-butadiene rubber, butadiene rubber, butyl rubber, ethylene-propylene rubber, chloroprene rubber and nitrile rubber.

5. A rubber composition according to claim 1, wherein the carbon black is present in an amount of from 30 to 80 parts by weight with respect to 100 parts by weight of the rubber component.

6. A rubber composition according to claim 2, wherein the carbon black is present in an amount of from 30 to 80 parts by weight with respect to 100 parts by weight of the rubber component.

7. A rubber composition according to claim 1, wherein the concentrations of the phenolic hydroxyl groups and the carboxyl groups introduced into the surface of the carbon black are not less than 0.1 meq/g and not more than 0.15 meq/g, respectively.

8. A rubber composition according to claim 2, wherein the concentrations of the phenolic hydroxyl groups and the carboxyl groups introduced into the surface of the carbon black are not less than 0.1 meq/g and not more than 0.15 meq/g, respectively.

* * * * *